June 30, 1942.  M. G. EDWARDS ET AL  2,288,075
ROCK DRILL
Filed Sept. 18, 1939  3 Sheets-Sheet 3
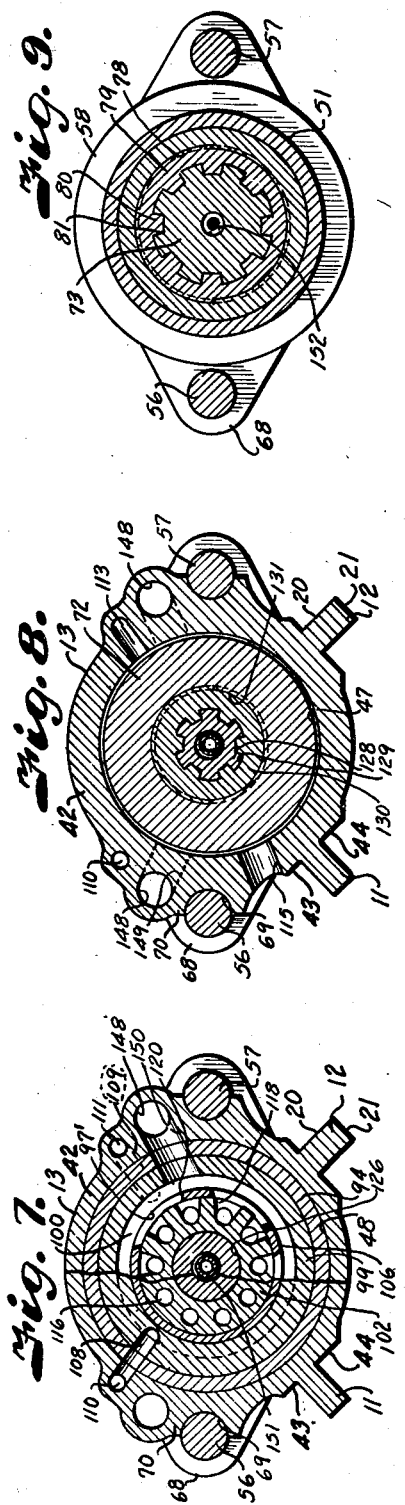
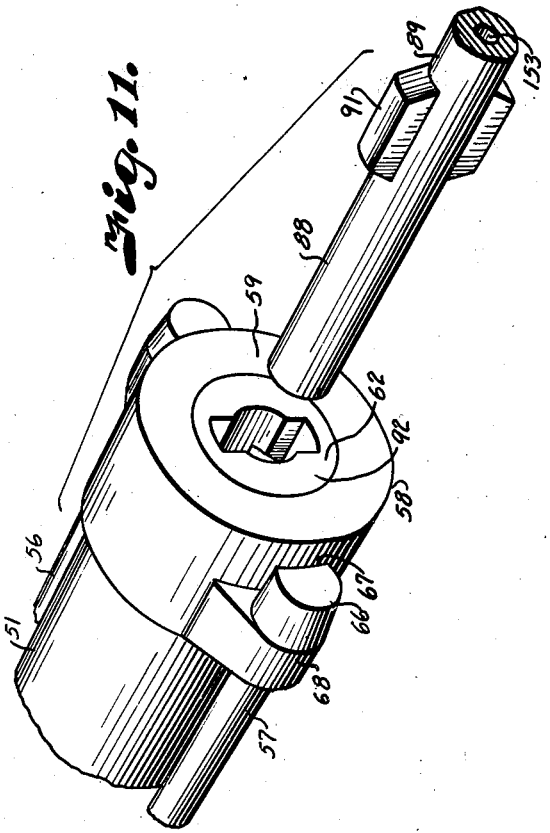
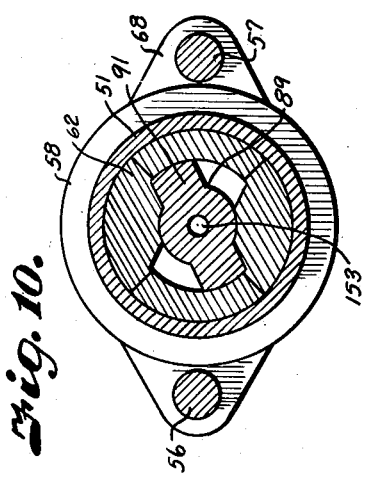
INVENTORS
Milon Gay Edwards, and
Frank M. McKinley.
BY Arthur C. Brown
ATTORNEY Patented June 30, 1942

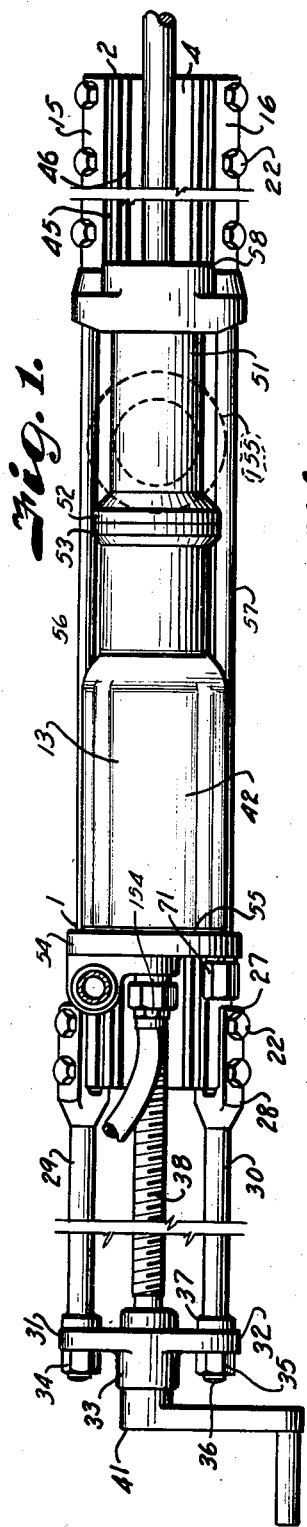

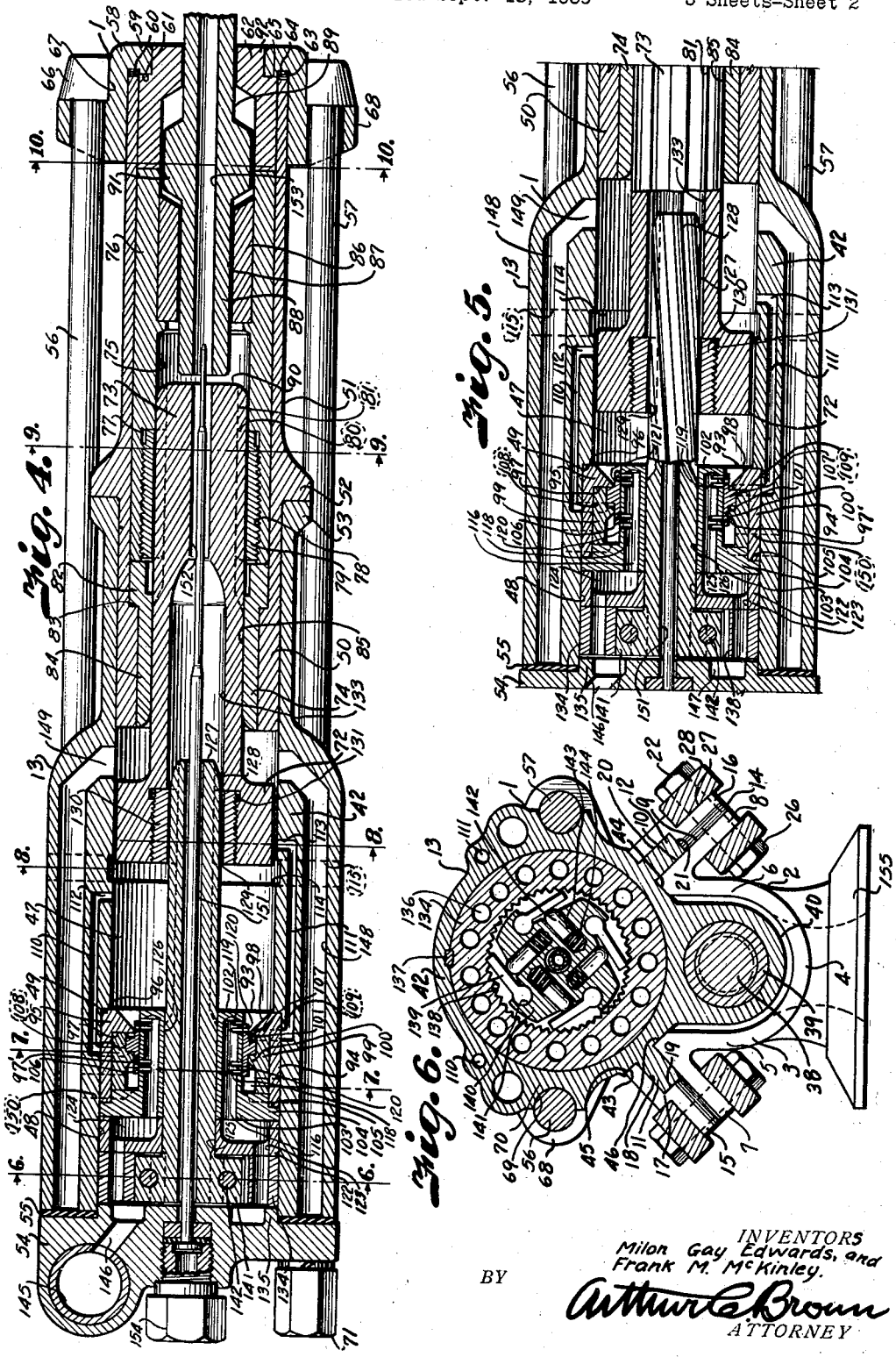

2,288,075

UNITED STATES PATENT OFFICE 2,288,075

ROCK DRILL

Milon Gay Edwards and Frank M. McKinley, Joplin, Mo.

Application September 18, 1939, Serial No. 295,356

7 Claims. (Cl. 255—45)

This invention relates to rock drills particularly of the pneumatic type, and has for its principal object to provide a drill of this character constructed to reduce wear of the working parts and to provide for ready adjustment of the parts when wear occurs so as to maintain the drill in long, efficient service.

Other objects of the invention are to provide an automatic valve construction wherein the valve has a relatively short, quick-acting stroke with full port capacity; to provide the drill with a combination front washer and head equipped with a removable chuck end; to provide the drill with guides so arranged that the axis of the drill mechanism is located near the axis of the feed screw; to provide a guide construction having greater contact area with respect to the guideways of the guide shell so as to avoid looseness and vibration incidental to operation of the drill; to provide the guideways with adjustable means to compensate for wear; and to provide relative short rods for connecting the guide shell with the feed screw bearing.

In accomplishing these and other objects of the invention, hereinafter pointed out, we have provided improved details of structure, the preferred form of which is illustrated in the accompanying drawings, wherein:

Fig. 1 is a plan view of a rock drill constructed in accordance with the present invention.

Fig. 2 is a side elevational view of the rock drill showing a part thereof broken away to better illustrate the feed screw and nut whereby the drill proper is moved along the guide shell.

Fig. 3 is a detail perspective view of the guide shell showing one of the top half-ways and shims removed from the lower way and located in spaced relation therewith.

Fig. 4 is a longitudinal section through the drill.

Fig. 5 is a similar section taken through the cylinder portion of the drill, particularly illustrating the spiral rifle bar and the automatic valve construction.

Fig. 6 is a cross-section on the line 6—6 of Fig. 4, and illustrating the ratchet mechanism.

Fig. 7 is a cross-section through the valve chest portion of the drill taken on the line 7—7 of of Fig. 4.

Fig. 8 is a cross-section through the drill cylinder and piston taken on the line 8—8 of Fig. 4.

Fig. 9 is a cross-section through the drill at the point of the chuck nut and taken on the line 9—9, Fig. 4.

Fig. 10 is a section through the chuck end of the drill taken on the line 10—10, Fig. 4.

Fig. 11 is a detail perspective view of the chuck end of the drill showing the shank of the drill steel in spaced relation therewith.

Referring more in detail to the drawings:

1 designates a rock drill constructed in accordance with the present invention, and includes a guide shell 2 comprising a trough-shaped body 3 having a substantially semicylindrical bottom 4 and sides 5 and 6 terminating in downwardly inclined flanges 7 and 8 located in planes substantially 90° apart with respect to the central axis of the guide shell, as best shown in Fig. 6.

The outer faces 9 of the flanges 7 and 8 form the lower ways 10 for guide wings 11 and 12 carried by the drill cylinder 13 later described. Seated on the flanges 7 and 8 and below the way faces 10 are packs of shims 14 spacing top half-ways 15 and 16 from the lower half-ways. The top half-ways are coextensive with the length of the guide shell and have the under faces thereof provided with rabbet grooves 17 to form upper way faces 18 and shoulder faces 19 to respectively engage the upper faces 20 and edge faces 21 of the guide wings, a sufficient number of shims being employed in the packs so that the guides slide freely between the way faces without play between the respective parts.

The top half-ways are clamped to the flanges 7 and 8 by a series of fastening devices 22, such as bolts, having the shanks 23 thereof extending through registering openings 24 in the top half-ways and 25 in the flanges to be secured by nuts 26. The rear ends of the top half-ways are recessed, as at 27 (Fig. 3), to accommodate the yoke-shaped ends 28 of rods 29 and 30 having their rear ends extending through ears 31 and 32 projecting laterally from the feed screw bearing 33, the yoke ends being secured to the guide shell by the endmost pairs of bolts 22, as best shown in Figs. 1 and 2, and the rear ends are anchored in the ears 31 and 32 by nuts 34 and 35 threaded on reduced shanks 36 of the rods to draw the ears against stop collars 37 on the rods.

Rotatably mounted in the bearing 33 is a feed screw 38 which extends forwardly coaxially with the longitudinal axis of the shell bottom 4 for connection with a feed nut 39 carried by a depending lug 40 on the drill cylinder 13. The rear end of the feed screw extends through the bearing 33 and carries a crank 41 by which the feed screw is rotated in moving the drill cylinder along the ways of the guide shell.

The drill cylinder includes a cylindrical body 42 having the guide wings 11 and 12 previously mentioned and which extend radially therefrom at angles corresponding to the angles of the ways, and the side faces of the cylinder on the respective sides of the guide wings are surfaced as at 43 and 44 to engage edge faces 45 of the top edge ways and the edge faces 46 at the juncture of the flanges 7 and 8 with the side walls 5 and 6 of the guide shell, as clearly shown in Fig. 6, to further increase bearing contact with the guideways and wings.

The cylinder is bored at the front end thereof to provide a piston chamber 47 and the back head end is counterbored to provide a valve chamber 48 and form an annular stop shoulder 49 with the piston chamber (Fig. 4). The drill cylinder is of sufficient length to receive the front washer 50 formed as an integral part of the front head 51, the front head being provided with an annular collar 52 which abuts against a similar collar 53 formed on the front head of the cylinder (Figs. 1, 2 and 4). The opposite end of the cylinder is closed by a back head 54 that is clamped against a gasket ring 55 by draw-bolts 56 and 57 which also retain the chuck end head 58. The chuck end 58 is in the form of a cylindrical cap sleeved over the terminal end of the front head 51 and having an inwardly extending annular end flange 59 of sufficient width to overlap the end face 60 of the front head 51 and form a bearing surface 61 for the chuck jaw 62. The inner face of the flange 59 is provided with an annular groove 63 registering with the end face 60 to mount a series of ring shims 64 which upon removal take up wear between the face 61 and a corresponding bearing face 65 on the chuck jaw 62.

The heads 66 of the bolts 56 and 57 are provided with arcuate sides 67 for engaging the cylindrical surface of the chuck and prevent relative rotation of the bolts. The shanks of the bolts project through laterally extending ears 68 on the chuck end and through grooves 69 formed in lateral projections 70 on the body portion of the cylinder and through registering openings in the back head 54 to be secured by draw-nuts 71 whereby the parts are clamped together.

Slidably mounted in the piston cylinder is a piston or hammer 72 provided with a tubular shank 73 reciprocably mounted in a cylinder washer liner 74 and bore 75 of a chuck sleeve 76, the back end bore of the chuck sleeve being counterbored, as at 77 and provided with an internal thread 78 for mounting a threaded chuck nut 79. The chuck nut 79 is provided with straight splines 80 engaging grooves 81 in the shank of the piston whereby the piston is rotatably and slidably connected with the chuck sleeve. The cylinder washer liner has a head flange 82 on the forward end thereof that closely fits within the bore of the front head and is anchored between a shoulder 83 and the rear end of the chuck sleeve 76 as shown in Fig. 4. The sleeve-like body portion 84 of the liner fits closely within the rear end of the front head and forms a bearing surface 85 for the piston shank 73, the bearing surface of the liner being preferably plated with chromium to reduce the wear thereof and prolong the serviceability of the liner.

The chuck sleeve carries a chuck bushing 86 having a bore 87 to pass the head 88 of the drill steel 89 which projects into position for engagement by the end or hammer face 90 of the piston shank 73. The forward end of the chuck sleeve abuts against the chuck jaw 62 and effects rotation thereof through interconnection with the drive lugs 91 on the drill steel. The chuck jaw includes a reduced forward extension 92 that is rotatably mounted within the flange 59 of the chuck end 58.

Inset within the valve chamber of the drill cylinder and abutting against the shoulder 49 is a valve chest 93 including a ring-like body 94 closely fitting within the valve chamber and having an internal annular flange 95 at its forward end forming a stop shoulder 96 and a valve engaging face 97. The valve engaging face 97 intersects with a bevelled counterbore 98 that is formed in the forward end of the flange to effect ample passageway for flow of air into the piston chamber, as later described. Sleeved within the ring-like body of the valve chest is a replaceable valve bushing 99. The valve bushing 99 is also of sleeve-like character and has an internally extending rib 100 cooperating with the flange 95 to form the heads of an annular air cylinder 101.

The valve bushing is retained in position against the flange 95 by a valve plug 102, which includes a cylindrical body 103 having the end thereof terminating flush with the forward face of the flange 95. The opposite end of the body 103 carries an annular flange 104 provided with a shoulder groove 105 abutting against the rear end of the valve chest 93 and whereby a portion of the flange 104 is inset within the ring-like body of the valve chest to engage the replaceable valve bushing.

Reciprocable upon the body 103 is a sleeve-like valve 106 having the outer circumference thereof slidingly contacting the inner face 97' of the rib 100 and the bearing face 97 of the flange 95 so as to close the ends of the air cylinder 101. Extending circumferentially of the valve sleeve is a flange-like piston 107 to effect reciprocation of the sliding valve upon admission of air to the respective ends of the air chamber, through air ports 108 and 109 respectively that are connected by channels 110 and 111 with ports 112 and 113 located respectively on the front and rear sides of an exhaust groove 114 formed within the wall of the cylinder and having connection with radial exhaust ports 115 extending through the walls of the cylinder body.

The ports 112 and 113, as well as the exhaust ports, are under control of the piston 72 as later described. The body of the valve plug is provided with a circular series of bores 116 terminating short of the forward end thereof to provide air passageways to rear and front sets of air ports 118 and 119. The sets of ports 118 and 119 are formed by grooving the body of the valve plug so that the grooves intersect the bores 116. The ports of the respective sets are of relatively narrow width and of close spacing, however, they are of sufficient length to provide ample port area for the free passage of air therethrough under control of the sleeve-like valve 106. The ends of the sleeve valve are provided with ports 120 and 121 adapted to alternately register with the innermost ports of the respective sets, the outer ports of the respective sets being covered and uncovered by the end portions of the sleeve valve so that no additional valve ports are necessary in the sleeve valve.

Inset within the valve chamber and abutting against the flange of the valve plug is a rear valve plate 122 having ports 123 connecting with the ports 116 through an annular recess 124 formed in the front side of the plate. The valve plate 122 and valve plug are provided with registering axial bores 125 and 126 in which are rotatably mounted a rifle bar 127 having spiral splines 128 engageable with correspondingly shaped grooves 129 in a rifle nut 130, the rifle nut being threadedly mounted in a recess 131 formed by a counterbore in the piston 72.

The shank 73 of the piston is provided with a bore 133 for receiving the rifle bar when the piston is moved retractively toward the rear end of the piston chamber. Also received within the valve chamber of the cylinder is a ratchet ring 134 that is clamped between the rear valve plate and an inwardly extending rib 135 formed on the back head 54, the ratchet ring being provided with a circular series of ports 136 registering with the ports 123 in the valve plate. The ratchet ring and valve plate are retained from rotation within the cylinder by a spline 137 as shown in Fig. 6. The inner circumference of the ring is provided with a series of ratchet teeth 138 which are engaged by ratchet pawls 139 pivotally mounted in sockets 140 of a ratchet head 141 formed as a part of the rifle bar 127, the ratchet pawls being yieldingly retained in position to engage the ratchet teeth by plungers 142 slidably mounted in sockets 143 under the action of compression springs 144. The pawls are so arranged that rotation of the ratchet head is prevented in one direction, for example a clockwise direction (Fig. 6), but the head is free to rotate in an anticlockwise direction incidental to reciprocation of the piston on the rifle bar. Therefore when the piston moves in one direction it is rotated to effect rotation of the drill steel through the spline connection of the piston shank with the chuck sleeve and when the piston is moved in the opposite direction the ratchet head is free to rotate so that the piston merely reciprocates in the cylinder.

Live air is admitted through the back head by way of a valve 145 having connection with a port 146 leading to a groove 147 in the back head which connects all the bores 136.

If the forward set of valve ports is uncovered the live air is admitted directly into the rear end of the piston cylinder through the forward set of ports and if the rear set of ports is uncovered live air is admitted into the opposite or forward end of the piston chamber through air passageways 148 that are provided in the ribs 7 on the cylinder and which have their outer ends closed by the back head. The inner ends of the passageways connect with the forward end of the cylinder through ports 149. The passageways are connected with the interior of the valve chest through radial ports 150 so that when the rearmost set of ports is uncovered live air is admitted through the radial ports into the passageways for action on the forward side of the piston to move the piston in retractive direction.

The rifle bar, forward end of the piston and the drill rod, are provided with coaxial bores 151, 152 and 153 respectively for the admission of a drilling fluid by way of a connection 154 mounted on the back head 54 as in conventional drill construction.

The shape of the slide valve permits chromium plating of the inner surface thereof to prolong the serviceability thereof. The inner contacting faces of the valve bushing and valve chest may likewise be plated with chromium or similar material.

The drill may be mounted in any suitable manner, for example the guide shell may be provided with a trunnion plate 155 which is attachable to any conventional tripod or drill mounting (not shown) but which are conventional in rock drill practice.

In operating the drill, live air is admitted by way of the back head into the bores 122 of the valve plug. Assuming that the parts are in the position shown in Fig. 4, the live air is passing through the forward set of valve ports and into the rear end of the piston chamber. Since the piston has uncovered the exhaust ports 115 it is nearing completion of its forward stroke and air is being trapped between the forward face of the piston and the end of the front washer to check movement thereof. On uncovering of the exhaust ports, the sudden rush of air therethrough effects forward movement of the valve sleeve which is supplemented by the air pressure acting through the port 112, passageway 110 and port 108 on the rear face of the annular piston 101 so that the valve is shifted to close the forward set of ports and open the rear set of ports. When the forward set of ports is shut off, live air ceases to pass into the rear end of the piston chamber and begins to pass through the uncovered rear set of valve ports and through the radial ports 150 into the passageway 148 for discharge into the forward end of the piston chamber through the ports 149 for action on the forward face of the piston and effects movement thereof to the opposite end of the piston chamber. Upon uncovering the port 113, live air is admitted through the passageway 111 to act on the front side of the annular valve piston to shift the valve in the opposite direction, completing one cycle. Similar pulsations of the piston will follow in rapid order as long as the valve 145 is open, each pulsation effecting a hammer blow of the piston shank against the drill steel. The rifling connection between the rifle bar 127 and the rifle nut 130 of the piston tends to rotate the piston during reciprocation thereof, however, the piston can only rotate when it is reciprocated in one direction by reason of the ratchet head and its pawl connection with the ratchet ring. When the piston is rotated, the chuck sleeve 76 is rotated through the spline connection with the chuck nut 79 to rotate the drill steel so that new surfaces thereof are presented to the rock during reciprocation thereof incidental to the hammer-like blows imparted through actuation of the piston.

The drill steel is kept in drilling contact with the rock by rotation of the crank 41 which moves the drill proper along the ways of the guide shell. The particular construction of the guides and the annular relationship thereof rigidly retain the drill proper to reduce vibration incidental to operation of the drill. The closer center of gravity of the operating mechanism with respect to the feed screw also enhances stability of the drill and facilitates the drilling operation. When the guides become worn they may be retightened by removing one or more of the shim strips. Likewise when the bearing faces of the chuck end become worn with respect to the chuck the bolts 56 and 57 are removed to permit removal of the chuck end, whereupon one or more of the shim rings may be removed to take up wear between the face 61 and the shoulder face 65 of the chuck 62.

The unit construction of the front washer and front head of the drill simplifies assembly and results in a more rigid construction. The cylinder washer liner as well as the chuck bushing are removable and readily replaceable when worn.

The sleeve valve construction and novel port arrangement provide for a maximum port opening with a shorter valve travel since it is necessary to move the valve only a distance substantially corresponding to the width of one of the ports.

The construction of the sleeve valve and valve bushing also permit chromium plating of the wearing parts so that they are serviceable for longer periods.

It is thus obvious that we have provided a rock drill which may be kept in service over a long period of time and when the parts becomes worn they are readily adjusted or are replaceable with new parts.

What we claim and desire to secure by Letters Patent is:

1. In an apparatus of the character described, a guide shell having downwardly diverging ways provided with bearing surfaces located in inclined planes intersecting with each other at a point above the shell, a drill cylinder having diverging guide wings slidably supported on said ways, means having surfaces contacting the guide wings in planes parallel with said bearing surfaces of the ways for retaining said guide wings in sliding contact with said ways, and actuating means for moving the drill cylinder on the guide shell.

2. In an apparatus of the character described, a guide shell having downwardly diverging ways provided with bearing surfaces located in inclined planes intersecting with each other at a point above the shell, a drill cylinder having diverging guides slidably supported on said ways, means having surfaces contacting the guides in planes parallel with said bearing surfaces of the ways for retaining said guides in sliding contact with said ways, removable shims inserted between said ways and the retaining means, and actuating means for moving the drill cylinder on the guide shell.

3. In an apparatus of the character described, a guide shell having downwardly diverging ways, a drill cylinder having diverging guide wings slidably supported on said ways, means retaining said guide wings in sliding contact with said ways, a feed screw, rod-like members connected with said shell in end alignment with said guide wings, a feed screw bearing supported by the rod-like members for mounting the feed screw, and a feed screw nut on the cylinder threadedly engaged with said feed screw.

4. In an apparatus of the character described, a trough-like guide shell having downwardly inclined flanges on opposite sides thereof to form spaced ways having bearing surfaces located in planes intersecting with each other at a point above said shell, a drill cylinder having similarly inclined guide wings slidably supported on said bearing surfaces, upper ways having rabbet grooves forming plane-like bearing portions engaging over said guide wings and in planes parallel with the planes of the first named bearing surfaces, shims between the upper ways and said flanges, and fastening devices extending through said upper ways, shims and flanges to retain said cylinder in sliding support on said shell.

5. In an apparatus of the character described, a trough-like guide shell having downwardly inclined flanges on opposite sides thereof to form spaced ways, a drill cylinder having similarly inclined guide wings slidably supported on said ways, upper ways having rabbet grooves forming portions engaging over said guide wings, fastening devices for retaining the upper ways in contact with the spaced ways, a feed nut carried by the drill cylinder in the axis of said trough-like shell, a feed screw threaded in said nut, a bearing for the feed screw, and rods supporting the bearing and having ends connected with the ends of the guideways of the guide shell.

6. In an apparatus of the character described, a substantially semicylindrical guide shell, a drill cylinder, downwardly diverging ways extending along the sides of said guide shell and having bearing surfaces arranged in planes at substantially 90° angle relatively to the axis of said drill cylinder and intersecting with each other on an axis located within the drill cylinder, correspondingly arranged wings on the drill cylinder, means having plane-like bearing surfaces parallel with the bearing surfaces of the ways engaging similar bearing surfaces of the wings for retaining the wings in sliding engagement with the ways, and actuating means connecting the guide shell with the drill cylinder for moving the drill cylinder relatively to the guide shell.

7. In an apparatus of the character described, a guide shell having downwardly diverging guideways coextensive with the sides thereof, a drill cylinder having diverging guide wings slidably supported on said guideways, upper ways engaging over the guide wings, means securing the upper ways to the downwardly diverging guide wings, a feed nut carried by the drill cylinder substantially in the axis of the guide shell, a feed screw threaded in said nut, a bearing for the feed screw, rods having yoke-shaped ends fixed to said securing means at the ends of said ways, and means connecting the rods to said bearing.

MILON GAY EDWARDS.
FRANK M. McKINLEY.